United States Patent [19]

Liljestrand

[11] 4,046,528
[45] Sept. 6, 1977

[54] DEGASSING SYSTEM

[75] Inventor: Walter E. Liljestrand, Midland, Tex.

[73] Assignee: Smith International, Inc., Newport Beach, Calif.

[21] Appl. No.: 572,220

[22] Filed: Apr. 28, 1975

[51] Int. Cl.² .................................................. B01D 19/00
[52] U.S. Cl. ........................................ 55/160; 55/192; 55/201; 55/206
[58] Field of Search .................. 55/52, 55, 183, 185, 55/186, 192, 201, 206, 414, 415, 468, 470, 160-166

[56] References Cited

U.S. PATENT DOCUMENTS

| | | | |
|---|---|---|---|
| 1,095,463 | 5/1914 | Kieser | 55/201 X |
| 2,243,176 | 5/1941 | Vander Henst | 55/185 |
| 2,869,673 | 1/1959 | Erwin | 55/192 |
| 3,193,989 | 7/1965 | Sebeste | 55/192 X |
| 3,241,295 | 3/1966 | Griffin et al. | 55/165 |
| 3,255,576 | 6/1966 | Dawkins | 55/192 |
| 3,555,819 | 1/1971 | Burnham, Sr. | 55/193 X |
| 3,616,599 | 11/1971 | Burnham, Sr. | 55/55 X |
| 3,769,779 | 11/1973 | Liljestrand | 55/166 |

FOREIGN PATENT DOCUMENTS

| | | | |
|---|---|---|---|
| 1,190,696 | 4/1965 | Germany | 55/199 |

*Primary Examiner*—Frank A. Spear, Jr.
*Assistant Examiner*—Richard W. Burks
*Attorney, Agent, or Firm*—Browning, Bushman, & Bamecki

[57] ABSTRACT

A system for degassing fluids, particularly drilling muds, which includes a pump for introducing the gas laden fluid, under pressure, into a closed degassing vessel wherein the gas is disengaged, in a substantially oxygen free atmosphere, from the fluid, the gas and degassed fluids leaving the degassing vessel through a common outlet which is equipped with an exhausting system for discharging the disengaged gas from the system.

17 Claims, 6 Drawing Figures

DEGASSING SYSTEM

BACKGROUND OF THE INVENTION

The present invention relates to a system for degassing fluids and, more particularly, to a system for degassing drilling muds.

There are numerous industrial operations where it is not only desirable but expedient that dissolved and/or entrained gas be removed from a liquid or slurry. An important example of this exists in the oil well drilling industry where the drilling mud used in the drilling operation frequently becomes contaminated with natural gas, hydrogen sulfide or other gases encountered in various downhole formations. The presence of such gases in the drilling mud decreases its weight and viscosity, thus markedly diminishing its effectiveness in preventing blowouts. Furthermore, some of the gases encountered in drilling operations, in addition to being toxic, are quite corrosive to drill strings and attendant equipment. Since it is uneconomical to continuously supply a source of new mud, it is necessary that the mud be recycled.

Numerous prior art systems have been proposed as systems for degassing drilling muds. Most of these systems utilize a degassing tank, maintained under vacuum, and various baffles and other such structures disposed interiorly of the tank designed to produce thin, flowing films of the mud to ensure a large surface area of the mud. The vacuum in the tank serves not only to draw the mud into the tank, but also to facilitate release of the gas from the thin film.

Several problems are associated with the use of a vacuum degasification system such as described above. For one, the degassing vessel, of necessity, requires the provision of means to maintain the necessary vacuum conditions within the degasser vessel. This can be accomplished with the use of an auxiliary vacuum pump such as disclosed in U. S. Pat. No. 3,241,295 or by various Venturi type ejector systems such as shown in U.S. Pat. No. 3,616,599. Such systems, as will be readily understood, present operational problems in that the level of mud and/or vacuum in the degassing vessel must be accurately controlled. As described in the two prior art patents noted above, this control is achieved by the use of relatively complicated float valve mechanism employed in the degassing vessel which, for example, in conjunction with the vacuum system such as the Venturi type dual ejector apparatus shown in U. S. Pat. No. 3,616,599, serve to maintain control of the vacuum in the degassing vessel. Such control systems are inherently complicated, costly to manufacture and pose potentially substantial maintenance problems.

Other prior art mud degassing systems control the vacuum in the degassing vessel, and hence the mud level therein, by the simple expediency of a valve mechanism to admit air thereby reducing the vacuum and the mud inflow. The latter type systems suffer from the disadvantage that potentially explosive mixtures of admitted air and gas evolved from the return drilling mud may occur in the degassing vessel. The hazard to human life and property in the event of an explosion of a degassing system such as might occur on an offshore drilling rig is readily apparent.

U. S. Pat. No. 3,769,779 discloses a system for degassing fluids in which the degassing vessel is not operated under subatmospheric pressure conditions. In the system shown in the aforementioned patent, which is herein incorporated by reference, a centrifugal pump forces the gas laden drilling mud into a degassing vessel under pressure in such a manner that the drilling mud is deposited as a thin film on the inner surface of the wall of the degassing vessel whence it flows to the bottom of the vessel and through a suitable outlet for reuse in the drilling operations. Because such a large surface area of the drilling mud is achieved in the system described above, the release of the gas in the degassing vessel is highly efficient. Accordingly, the system does not require the use of an external vacuum source. Thus, the system may be considered to be an atmospheric degasser.

While the system described in aforementioned U. S. Pat. No. 3,769,779 is a highly efficient system for the degasification of drilling muds, since it does act as an atmospheric degasser, there is the possibility that air can be introduced into the degassing vessel through the outlet of the degasser thereby creating a potentially explosive gas mixture with the disengaged gas.

SUMMARY OF THE INVENTION

It is therefore an object of the present invention to provide an improved system for degassing fluids and more particularly for degassing drilling muds.

A further object of the present invention is to provide a fluid degassing system employing an atmospheric degassing vessel.

Still another object of the present invention is to provide a degassing system in which the gas laden fluid is degassed in a subsantially oxygen free environment.

These and other objects of the present invention will become apparent from the drawings, the description given herein and the appended claims.

In accordance with the above stated objects, the present invention provides a fluid degassing system including a degassing vessel having an inlet and an outlet for the intake and discharge of the fluid being treated, the outlet serving also as a discharge for the gas disengaged in the vessel. The system further includes means, such as a pump, connected to the inlet of the degassing vessel for forcing the fluid to be treated into the vessel. An exhaust means connected to the outlet of the degassing vessel serves to remove the gas which has been disengaged in the degassing vessel for discharge to atmosphere or recovery if desirable.

DESCRIPTION OF THE PREFERRED EMBODIMENT

In the description that follows, the present invention will be described with reference to the degassing of drilling muds. It is to be understood, however, that the system can be used for degassing other liquids and/or slurries containing entrained and/or dissolved gases.

Figure 2:
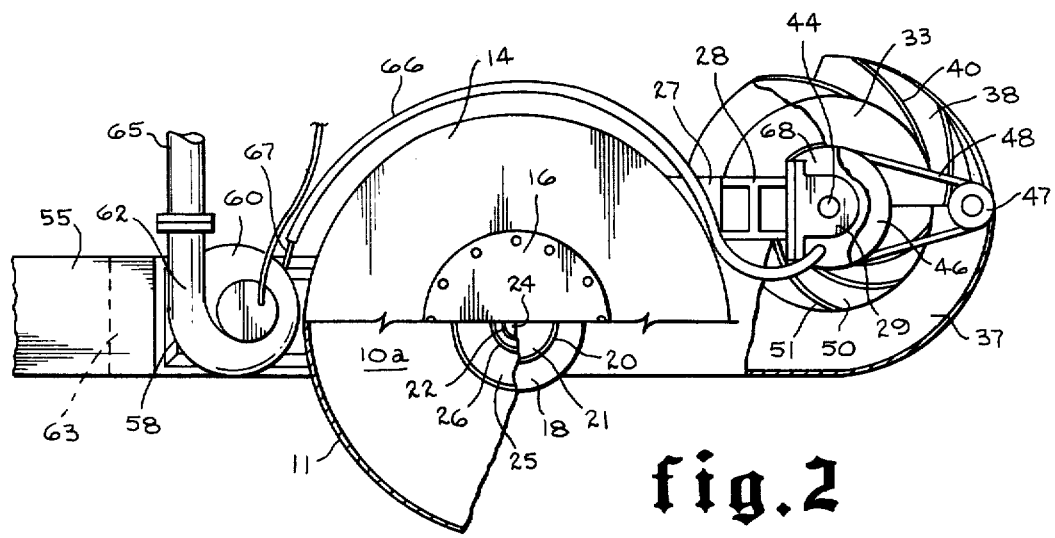
FIG. 2 is a top planar view, partly broken away, of the system shown in FIG. 1.
Figure 1:
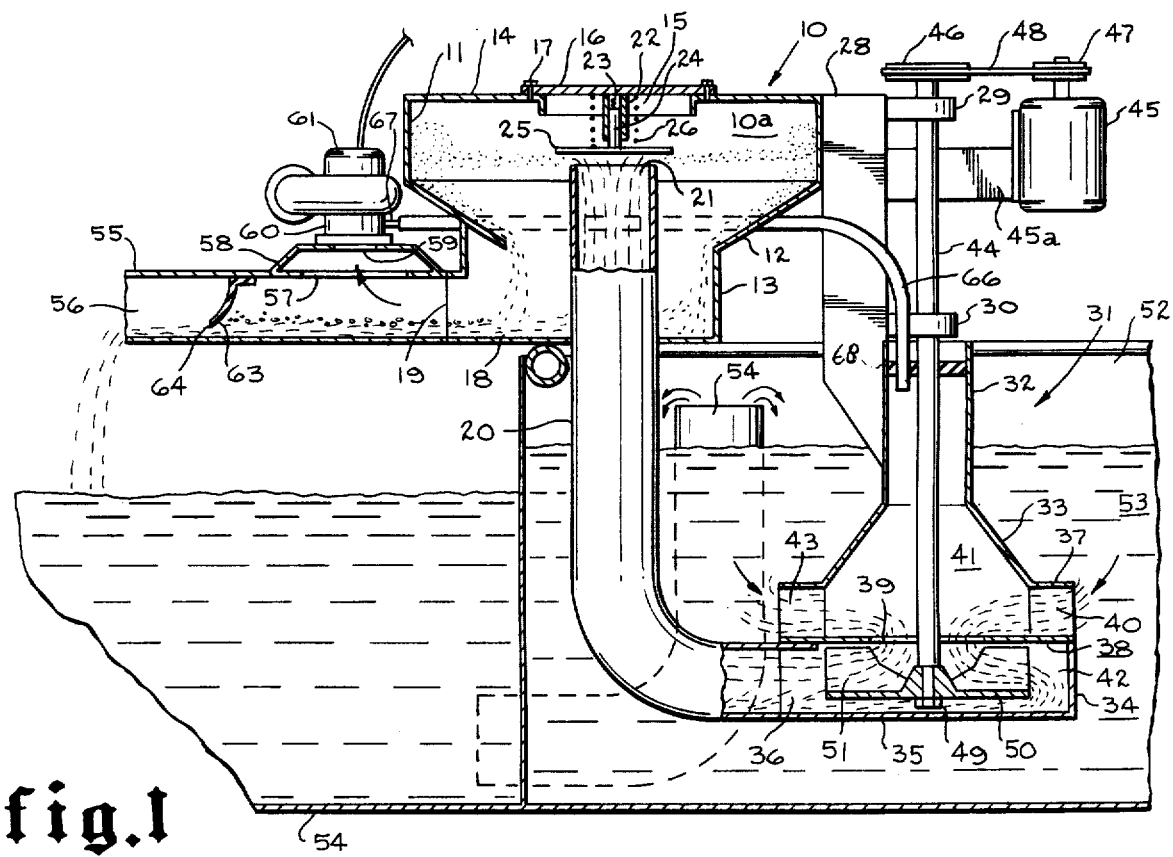
FIG. 1 is an elevational view, partly in section, showing one embodiment of the degassing system of the present invention.

Referring then to FIGS. 1 and 2, there is shown basically a degassing system such as described in U. S. Pat. No. 3,769,779. The degassing vessel shown generally as 10, forming a closed degassing chamber 10a, comprises a cylindrical upper section 11 and inverted, truncated conical intermediate section 12 and a lower generally cylindrical collecting section 13. A top wall 14 integral with cylindrical section 11 has an opening 15 sealed with a batch 16 secured to top plate 14 by means of bolts 17 in a conventional manner. A bottom wall 18, integral with lower cylindrical collector section 13, defines with section 13 a generally rectangular outlet 19 for degassing vessel 10.

Extending upwardly through bottom wall 18 is mud feed pipe 20 which provides an inlet 21 into chamber 10a of degassing vessel 10. Affixed to the underside of hatch 16 and extending interiorly into chamber 10a guide member 22 having a longitudinally extending guideway 23. Received in guideway 23 is a spindle 24 on one end of which is secured a substantially planar spray plate 25. A compression spring 26 has one end secured to the underside of hatch 16 and the other end secured to spray plate 25, spring 26 being generally concentrically disposed about guide member 22, guideway 23, and spindle 24.

Secured to the side of degassing vessel 10 is bracket 27 (FIG. 2) to which is secured a vertically extending I-beam 28. Mounted on I-beam 28 are pump shaft journal members 29 and 30 respectively and motor mounting bracket 45a.

I-beam 28 also serves to mount a centrifugal pump shown generally at 31. Pump 31 comprises an upper cylindrical section 32, an intermediate, truncated conical section 33 and a lower, cylindrical section 34. Cylindrical section 34, in cooperation with bottom wall 35, forms tangential pump outlet 36 which is in open communication with feed pipe 20. Extending radially outward from the lowermost edge of intermediate conical section 33 is annular flange 37, the outside diameter of annular flange 37 being approximately the same as the diameter of cylindrical lower section 34. An impeller wear plate 38, having a generally centrally disposed circular opening 39, is secured at the uppermost edges of cylindrical section 34. Extending generally vertically between and attached to the underside of annular flange 37 and the top side of impeller wear plate 38 are a plurality of radially disposed spiral vanes 40. Spiral vanes 40, in cooperation with annular flange 37 and impeller wear plate 38, form a circumferentially extending pump inlet 43.

A pump shaft 44 suitably journaled in brackets 29 and 30 and driven in a conventional manner by means of motor 45, drive pulleys 46 and 47 and drive belt 48 extends substantially vertically into pump 31 terminating in chamber 42. Secured to the end of shaft 44 in chamber 42 by means of a hub 49 is an impeller 50 having vanes 51.

Pump 31 is disposed in return mud receiver 52, pump inlet 43 extending below the level of mud 53. A return conduit 54 extends between return mud receiver 52 and clean mud receiver 54 and serves to ensure that return mud receiver 52 will always have a supply of mud available for pump 31 to circulate when the system is in operation.

Connected to outlet 19 of degassing vessel 10 is a trough 55 having an open end 56 for conveying the degassed mud into clean mud receiver 54. Trough 55 is generally rectangular in configuration, having a top and bottom wall and opposing sidewalls and an opening 57 between its open end 56 and the outlet 19 of degassing vessel 10. Disposed in surrounding relationship to opening 57 is a gas collecting hood 58. Mounted atop hood 58 and having its intake in open communication with a venthole 59 in hood 58 is a blower 60 driven by suitable motor 61. Blower 60 is conveniently a single stage centrifugal blower having an axial intake and a tangential discharge shown best in FIG. 2 at 62.

Disposed internally of trough 55 between the outlet 56 and opening 57 is a movable gas seal comprised of a flexible flap 63 suspended from and secured to the upper wall of trough 58. Since flap 63 is flexible, mud leaving degassing vessel 10 and flowing through trough 55 will raise the lower edge 64 of flap 63, falling into clean mud receiver 54. In addition to the rubber flap serving as a substantial gas seal so as to provide basically a sealed system, flap 63 acts to skim the surface of the mud in trough 55 and permit disengagement of the gas bubbles trapped in the froth flowing on the top of the degassed mud.

In operation, the system described above works as follows. Return mud 53, containing various gases entrained or dissolved in the mud during the drilling operation is drawn into pump 31 from return mud receiver 52 through inlet 43 and forced, under pressure, into chamber 10a of degassing vessel 10. Since inlet 21 of feed pipe 20 is disposed closely adjacent the underside of spray plate 25, fluid being forced into chamber 10a impinges on the underside of spray plate 25 and is forced radially outwardly in fine droplets toward the inner walls of degassing vessel 10. The fine droplets collect on the inner walls of degassing vessel 10 and flow in a generally thin film downwardly to collector section 13. It will be observed that since spray plate 25 is attached to spring 26 it acts in the nature of a flow control valve to the extent that if flow through feed pipe 20 is increased, spray plate 25 moves upwardly away from inlet 21 against spring 26 to permit a greater flow of fluid into chamber 10a. However, the biasing effect of spring 26 ensures that the greater volume of fluid thus entering chamber 10a is still forced into fine droplets to facilitate the release of gas from the mud.

The degassed fluid which collects in lower cylindrical section 13 and the gas released in chamber 10a leaves chamber 10a through outlet 19. The mud flows through trough 55 past flap 63 and falls into clean mud receiver 54. It will be observed that both the degassed fluid, e.g. the mud, and the disengaged gas leaves chamber 10a together through outlet 19, the gas collecting above the degassed mud. Upon entering trough 55, the gas, via opening 57, collects in hood 58 and is thence drawn into the intake of blower 60 being discharged through outlet 62. In the event that the gas being exhausted from the system through blower 60 is of a toxic or potentially explosive nature, a conduit 65, of suitable length, can be connected to the discharge 62 of blower 60 to ensure that the exhausted gas will be vented at a point remote from the degassing system and the drilling operations.

Since vessel 10 is a substantially closed vessel, the only air admitted is that which might be contained in return mud 53 being forced into degassing vessel 10. Accordingly, the degasification of the mud in chamber 10a occurs in a substantially oxygen free atmosphere comprised of the gases released from the used mud in chamber 10a. Thus, the potential hazard of an explosive gas mixture accumulating in vessel 10 is virtually eliminated. The presence of the movable gas seal, i.e. flap 63, permits blower 61 to produce a slight vacuum on the order of one to five inches of water internally of the system. This aids in the disengagement of the gas from the mud. However, it is to be understood, that moveble gas seal 63 is not essential and can be dispensed with if desired. It should also be noted that the capacity of blower 60 is chosen so as to be greater than the volume of gas being evolved in vessel 10. Accordingly, there is a net air inflow via the open end 56 of trough 55 which prevents gas released in vessel 10 from by-passing blower suction through hood 58.

Blower 60 may also be employed to exhaust any gas disengaged in pump 31. A host 66 connected to a nipple 67 which is in open communication with the intake of blower 60 extends through a seal 68 disposed in upper cylindrical section 32 of pump 31. Gas disengaging in pump 31 and rising upwardly into the chamber formed by cylindrical section 32 will be drawn through hose 66 into blower 60 and exhausted through discharge 62.

Figure 6:
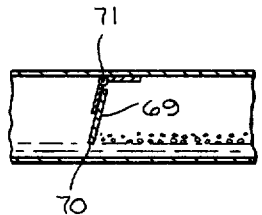
FIG. 6 shows another embodiment of the movable gas seal employed in the degassing system of the present invention.

Turning to FIG. 6, there is shown a variation of the movable gas seal means used in trough 55. A rigid flap 69 having a froth skimming end 70 is suspended by means of a hinge 71 from the top wall of the trough 55. It will be apparent that rigid flap 69, being hingedly suspended, functions in the same manner as described above for flexible flap 63.

Figure 3:
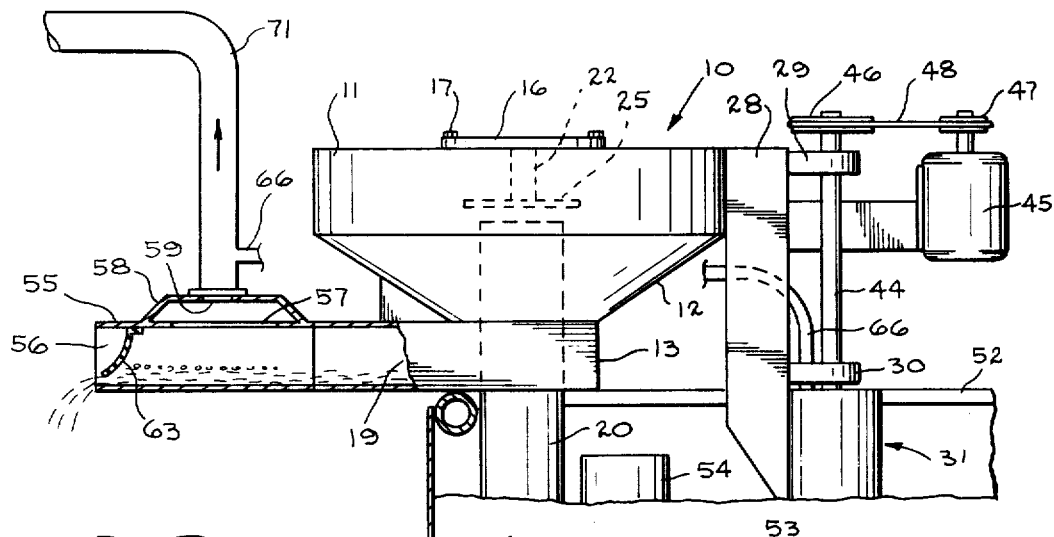
FIG. 3 is an elevational view, partly in section, showing another embodiment of the degassing system of the present invention.

Turning now to FIG. 3, there is shown another embodiment of the degassing system of the present invention. The system shown in FIG. 3 differs from that shown in FIG. 1 in that the blower system has been deleted. Connected to the outlet 59 of hood 58 is an exhaust conduit 71, exhaust conduit 71 having connected thereto hose 66 which leads to centrifugal pump 31. It will be appreciated that because of the presence of movable gas seal 63 in trough 55, a back pressure of disengaged gas develops internally of the degassing system comprised of the degassing vessel and the trough 55. The pressure is sufficient to force the gas exiting the degassing vessel 10 up trough collecting hood 58 and into exhaust pipe 71 for venting at any desired location, depending upon the length of exhaust pipe 71. Gas accumulating in pump 31 will likewise be forced through hose 66 into exhaust pipe 71. As in the case of the embodiment shown in FIG. 1, the system shown in FIG. 3 provides a degassing system in which the mud is degassed in a substantially oxygen free atmosphere, and in which the necessity for a relatively high vacuum in the degassing vessel are eliminated.

Figure 4:
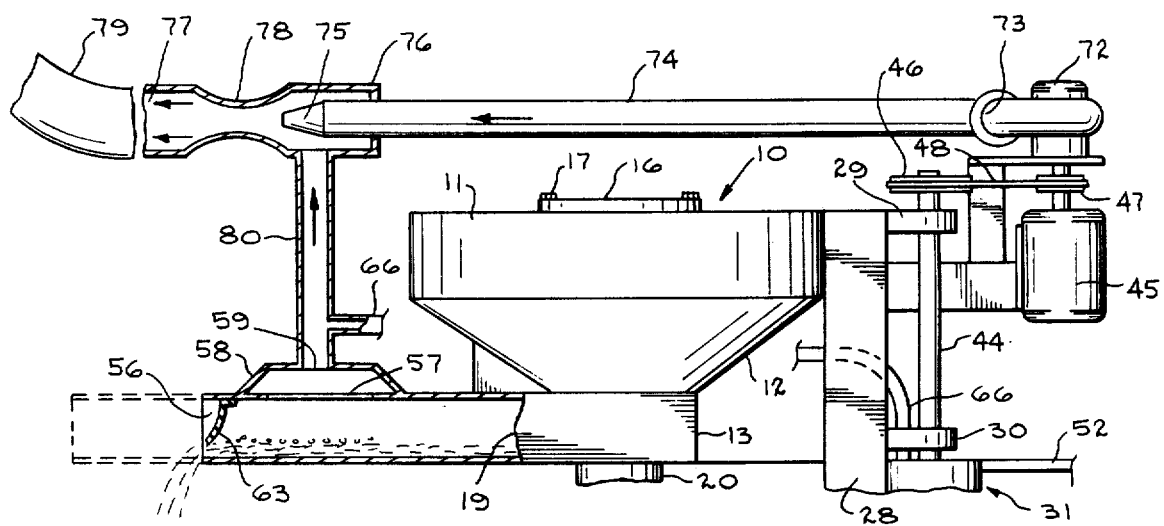
FIG. 4 is a partial elevational view, partly in section, showing still another embodiment of the present invention.

In FIG. 4 there is shown an embodiment of the present invention which employs a Venturi structure. A blower 72 driven by motor 45, which, as noted, also drives pump 31, has its discharge 73 connected to a drive fluid conduit 74. Drive fluid conduit 74 terminates in a nozzle 75 which is disposed internally of a nozzle housing 76 forming a chamber 77. Housing 76 is constricted at 78 thus forming a typical Venturi ejector structure. An exhaust conduit 79 is in open communication with chamber 77. Also in open communication with chamber 77 is a conduit 80 connected to hood 58.

In operation, blower 72 produces a flow of driving fluid which is discharged into fluid driving conduit 74. The driving fluid exits driving fluid conduit 74 through nozzle 75 and enters chamber 77 resulting in a reduced pressure within chamber 77 in a direction generally transverse to the flow of the jet of driving fluid exiting nozzle 75. An aspirating action is thus set up within chamber 77 which results in the removal, via conduit 80, of gas leaving degassing vessel 10 and collecting in hood 58. Likewise, gas disengaged in pump 31 is exhausted via hose 66 and conduit 80. As in the other embodiments described above, the embodiment of FIG. 4 provides a degassing system in which the mud is degassed in a substantially oxygen-free atmosphere without the need for controlling a relatively high vacuum within chamber 10a.

Figure 5:
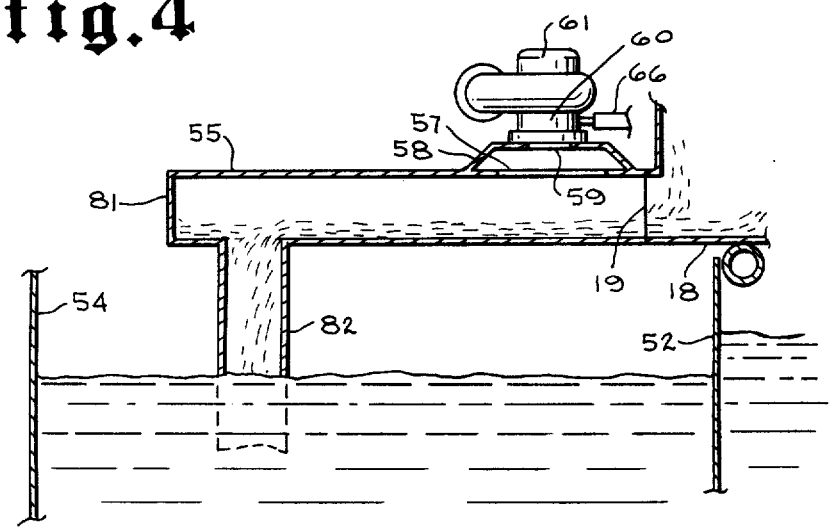
FIG. 5 is a partial elevational view, partly in section, showing yet another embodiment of the degassing system of the present invention.

FIG. 5 shows another embodiment of the degassing system of the present invention wherein there is provided a substantially closed system throughout. Trough 55 is closed as at 81 and is in open communication with a degassed fluid discharge conduit 82 which extends below the surface of the degassed fluid in receiver 54. While in the embodiment of FIG. 5, blower 60 is employed to remove gas from the system, it is to be understood that blower 60 could be dispensed with and the exhaust pipe shown in FIG. 3 substituted. Thus, as the pressure of the gas released from the fluid in degassing vessel 10 builds up in trough 55, it will be forced out exhaust pipe 71 in the manner described above for the embodiment shown in FIG. 3.

It will be understood that movable gas seal means 63 (FIG. 1), while preferable, is only essential in the embodiment shown in FIG. 3 where it is necessary that there be some means used to cause a pressure build up of gas within the system. In the other embodiments shown, the movable gas seal can be dispensed with since the positive action of the blower suffices to exhaust the gas from the system.

It will be apparent from the foregoing description that the present invention provides a degassing system, particularly for use in drilling muds, in which the fluid to be treated can be degassed in a vessel having a gas atmosphere comprised of the gas(es) dissolved and/or entrained in the fluid. Thus, the hazard of an explosion due to the degassing procedure being conducted in an oxygen containing environment is eliminated. Moreover, the need for complicated vacuum control systems for use on the degassing vessel are likewise eliminated. It should also be noted that in the novel degassing systems described above, the gas disengaged in the degassing vessels can be conveniently conveyed to a point remote from the degassing system and hence the immediate vicinity of the drilling rig. This is particularly advantageous in cases where the gas removed from the return mud is of a toxic nature and might, if there are insufficient wind currents to dispel the gas safely into the atmosphere, pose a serious health and safety hazard to workers on the rig.

I claim:
1. In a system for degassing fluids, the combination comprising:
   a degassing vessel having an inlet and an outlet, said outlet being disposed substantially at the bottom of said vessel and including an outlet conduit forming a common discharge from said vessel for said fluid and gas disengaged in said vessel;
   means connected to the inlet of said degassing vessel for introducing fluid under pressure into said vessel;

means connected to said outlet conduit for exhausting gas disengaged from said fluid in said vessel; and means for substantially preventing introduction of air into said vessel through said outlet conduit.

2. The system of claim 1 wherein said means for exhausting comprises blower means having its intake in open communication with outlet conduit of said degassing vessel.

3. The system of claim 2 wherein said means for exhausting further includes a gas collecting hood disposed between and in open communication with said outlet conduit and said intake.

4. The system of claim 1 further including movable gas seal means operatively connected to said outlet conduit, said gas seal means serving to permit discharge of said degassed fluid while preventing substantial release of said gas removed in said degassing vessel.

5. The system of claim 4 wherein said outlet conduit defines a trough in open communication with said outlet.

6. The system of claim 5 wherein said movable gas seal means is disposed in said trough.

7. The system of claim 6 wherein said trough includes a top wall, a bottom wall, and opposed side walls and said seal means comprises a flap member suspended in said trough and forming a substantial gas seal between said top wall and said flap.

8. The system of claim 7 wherein said flap member is comprised of a flexible material.

9. The system of claim 7 wherein said flap member is comprised of a rigid material hingedly suspended.

10. The system of claim 1 wherein said means for introducing fluid into said vessel comprises a centrifugal pump and there are removing means connected between said means for exhausting and said pump means for removing gas disengaged in said centrifugal pump.

11. The system of claim 4 wherein said means for exhausting includes atmospheric vent means in open communication with said outlet, said seal means inducing positive pressure of said gas in said outlet to force gas out said vent means.

12. The system of claim 1 wherein said exhausting means comprises means for establishing flow of driving fluid, a nozzle housing including a chamber and a nozzle connected to said means for establishing flow of said driving fluid to project a driving fluid jet through said chamber, said jet reducing the pressure within said chamber, and gas conduit means connecting said chamber and said outlet conduit of said degassing vessel.

13. The system of claim 12 including movable gas seal means operatively connected to said outlet conduit, said seal means serving to permit discharge of said degassed fluid while preventing substantial release of said gas removed in said degassing vessel.

14. The system of claim 12 wherein said means for establishing flow of said driving fluid comprises a blower means.

15. The system of claim 14 wherein said blower means and said means for introducing fluid into said vessel are driven by a common prime mover.

16. The system of claim 1 including a receiver for said degassed fluid and wherein said outlet conduit has one end in open communication with said outlet and the other end submerged in said degassed fluid in said receiver.

17. The system of claim 16 wherein said means for exhausting comprises blower means having its intake in open communication with said outlet conduit.

* * * * *